United States Patent [19]
Yang

[11] Patent Number: 5,576,613
[45] Date of Patent: Nov. 19, 1996

[54] DC MOTOR-GENERATOR CONTROL CIRCUIT

[76] Inventor: Tai-Her Yang, 5-1 Taipin Street, Si-Hu Town Dzan-Hwa, Taiwan

[21] Appl. No.: 338,692

[22] Filed: Nov. 14, 1994

Related U.S. Application Data

[63] Continuation-in-part of Ser. No. 32,136, Mar. 17, 1993, abandoned.

[51] Int. Cl.$^6$ .................................................. H02P 9/04
[52] U.S. Cl. .................... 322/16; 322/90; 322/14; 318/530; 318/493
[58] Field of Search ................. 322/16, 32; 318/530, 318/338

[56] References Cited

U.S. PATENT DOCUMENTS

| | | | |
|---|---|---|---|
| 3,569,809 | 3/1971 | Comer | 318/338 |
| 4,408,147 | 10/1983 | Gabel | 318/493 |
| 5,281,905 | 1/1994 | Dhyanchand et al. | 322/32 |
| 5,408,166 | 4/1995 | Yang | 318/530 |

Primary Examiner—Steven L. Stephan
Assistant Examiner—Nicholas Ponomarenko
Attorney, Agent, or Firm—Leonard Bloom

[57] ABSTRACT

The present invention relates to a DC control circuit for a main motor-generator set, in which a main motor includes an auxiliary shunt field winding. The control circuit includes a current follower motor that is driven by the armature current of the main motor and which drives an auxiliary generator to constitute a feedback unit. Electric energy produced by the auxiliary generator is applied to the auxiliary field of the main motor-generator set. The auxiliary field of the main motor-generator set may be excited with the same polarity as the main motor-generator set field winding to increase the field as the main motor-generator armature current increases, or with opposite polarity to reduce the field in response to main motor-generator current increasing. A control interface controls output voltage or output impedance from the auxiliary generator and selects a type magnetizing of aforesaid auxiliary field of the main motor-generator set.

8 Claims, 2 Drawing Sheets

5,576,613

DC MOTOR-GENERATOR CONTROL CIRCUIT

CROSS-REFERENCE TO RELATED APPLICATION

This application is a continuation-in-part of application Ser. No. 08/032,136, filed Mar. 17, 1993, now abandoned, the disclosure of which is incorporated herein in its entirety.

SUMMARY OF THE INVENTION

The present invention relates to a dynamic current feedback magnetizing type DC motor-generator control circuit for a motor-generator set (further called as a main motor-generator set or an electrical machine) using a current follower motor driving an auxiliary generator. A main motor of the main motor-generator set may be shunt, series, compound wound and includes an auxiliary shunt field winding. The control circuit current follower motor is driven by the armature current of the main motor generator set and drives an auxiliary generator, thereby constituting a feedback unit. Electric energy generated from such auxiliary generator is applied to the auxiliary field winding of the main motor generator set for magnetizing the auxiliary field with the same polarity as the field winding of the main motor generator set or with different polarity than the field winding of the main motor generator set to reduce the main motor field in response to increasing main motor generator set armature current. By a control interface a user may control the output voltage or output impedance from the auxiliary generator and further select either assistant or differential magnetizing of aforesaid main motor auxiliary field winding. The DC motor-generator control circuit is also applicable to a generator or dynamo motor and may replace an expensive magnetic saturation amplifier of other complicated switch loop control system which are presently used for controlling a performance of electrical machines.

DETAILED DESCRIPTION OF THE INVENTION

Conventional DC motor-generator sets include dynamo motors and generators. In general, dynamo motors have speed control and torsion feedback compensation in accordance with a load increase. For generators, alterations in driving speed resulting in voltage change or positive/negative feedback of input current against output voltage are most common.

The present invention relates to a new design for a control system for the aforesaid DC motor-generator set (further called as a main motor-generator set or an electrical machine), using a cheaper but reliable low power auxiliary motor and generator assembly (further called as the control circuit, or a feedback motor-generator set) for controlling the main motor-generator set of a greater power. The control circuit of the present invention provides good performance, high reliability and cheaper production cost compared to conventional and known to those skilled in the art types of control systems. A feature of the present invention lies in that the current follower motor of the control circuit is driven either by the armature current of the main motor-generator set, or by a mechanical rotary power source such as engine, fluid wheel wing or dynamo motor used for driving the main motor-generator set. In other words, the feedback motor-generator set derives the driving power from the same external power source that is used for running the main motor-generator set. The main motor-generator set may comprise the generator or dynamo motor, either shunt, series or compound, main motor-generator armature, series winding and shunt winding together with the armature, a power supply connected in parallel to the main motor-generator armature, independent main motor-generator auxiliary field winding, or other mechanical structure such as end casing spindle bearing, etc. The control circuit U101 of the present invention comprises a feedback motor-generator set. The feedback motor-generator set is driven by the energy from the main motor-generator set, including the main motor armature or the field of main motor-generator, in order to follow and produce electric energy for magnetizing the auxiliary field winding of main motor-generator.

Figure 1:
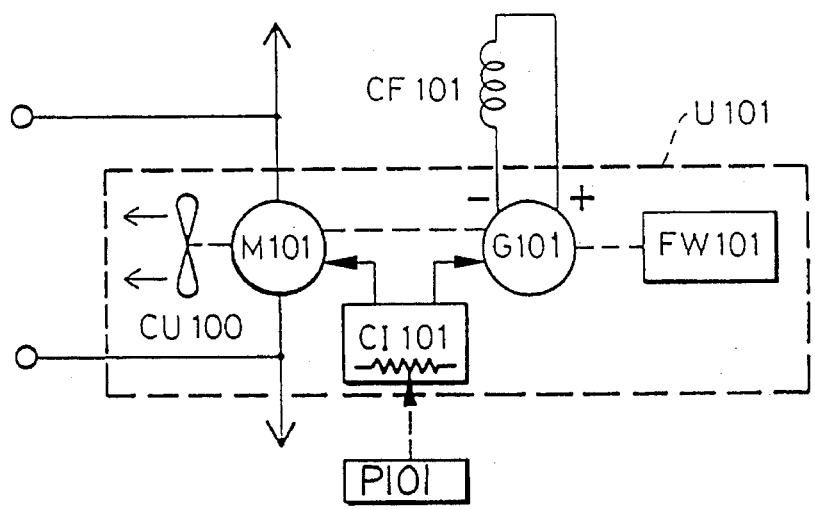
FIG. 1 is a diagramatic view showing the major elements of feedback unit of the present invention.

Referring to FIG. 1, the control circuit U101 of the invention comprises a follower motor M101 which may be a series, shunt, permanent-magnet, or compound motor. Electric energy for the current follower motor M101 may come from connection of motor M101 in series with series winding S101 or armature A101 of the main motor-generator set or from connection of motor M101 in parallel with the series winding S101 or armature A101 of the main motor-generator set. If the follower motor M101 is a shunt or permanent-magnet motor, it is parallel connected to the series winding S101 of the main motor-generator set.

Auxiliary generator G101 is driven by the follower motor M101 for producing an output for magnetizing an auxiliary field winding CF101 of the main motor. A relationship between the produced generating capacity and running speed of the main motor-generator set may either include a direct ratio or an inverse ratio subject to the wiring relationship between the follower motor M101 and the main motor-generator. The generator in the main motor-generator set set may comprise either a DC generator, an AC generator, or a rectifier.

Control interface CI101 is connected to the auxiliary generator G101 to control the output voltage or current value of the auxiliary generator G101. The control interface CI101 is not a subject of the present invention, and therefore it is not intended to be described in detail. However, it will be appreciated by those skilled in the art that the control interface CI101 is a user controlled device which controls an amount and a polarity of the output of the auxiliary generator G101 by controlling either the driving input of the follower motor M101 (including a control of the magnetizing current in the field winding or the voltage in the armature of the motor M101), a magnetizing voltage on the armature of the auxiliary generator G101, or output voltage of the generator G101 and the output current in the auxiliary field winding CF101. The aforesaid control can be provided, for example, by a voltage divider resistance and/or a potentiometer within the control interface CI101 or other means known by those skilled in the art. The interconnection of the control interface CI101 with other elements of the structure, and also various impedance arrangements (set-up or alterations) made by the user, are shown schematically in FIGS. 1–5. A power supply P101 may be used to power and control the CI101, or related switch device and a linear active device. However, the main power supply, shown in FIGS. 2–4 as—INPUT V1—, is produced by variation between the series winding S101 and the load (armature A101).

Figure 2:
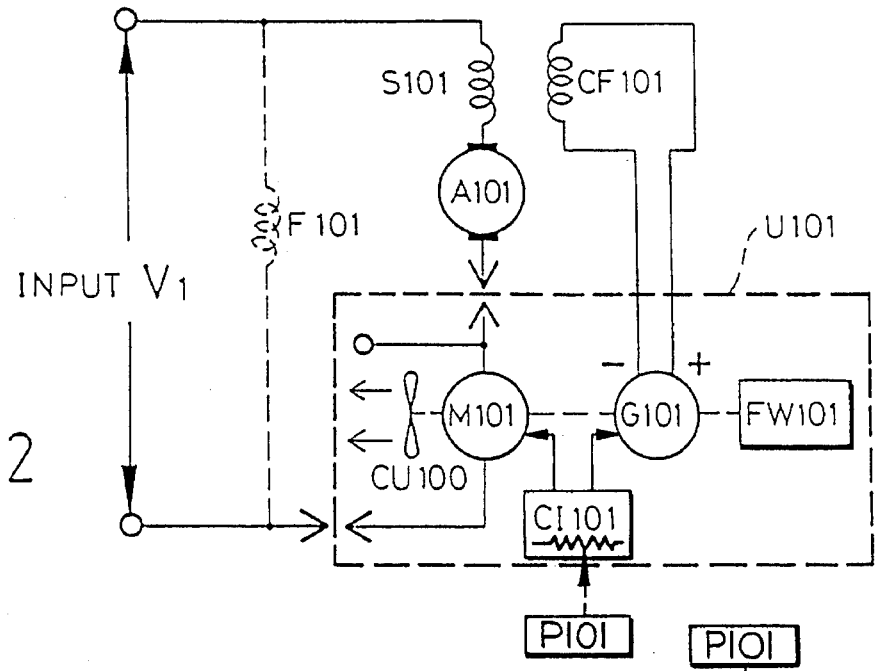
FIG. 2 is a diagram showing an embodiment of control circuit of the present invention in which the current follower motor is connected in series with the armature of the main motor generator set for using main motor generator set armature load current as the current for driving the current follower motor.

FIG. 2 is a diagram showing an embodiment of the present invention in which the follower motor M101 of the control circuit U101 is connected in series with the armature A101 of the main motor using armature load current as the current for driving the current follower motor M101.

The main motor of the main motor-generator set is a series motor including series field winding S101 and an auxiliary field winding CF101 for accepting control circuit U101 control and armature A101, or it may be a compound motor further including shunt field winding F101.

Auxiliary generator G101 is driven by the current follower motor M101 to produce output relative to running speed to magnetize the auxiliary field winding CF101 of the main motor, and it may magnetize winding CF101 with the same polarity as winding S101 or with opposite polarity depending on the wiring relationship between the motor M101 and the main motor-generator set.

Control interface CI101 is provided for controlling the auxiliary generator G101.

Figure 3:
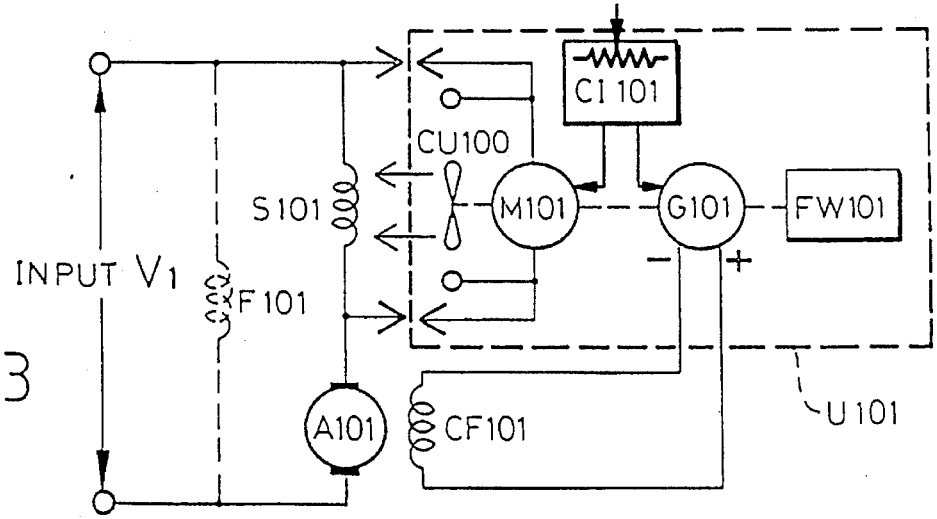
FIG. 3 is a diagram showing an embodiment of the invention in which the current-follower motor is connected in parallel with the series winding of the main motor generator set as the source of electric energy for driving the current follower motor.

FIG. 3 is a diagram showing an embodiment of the present invention in which the follower motor M101 of the control circuit U101 is parallel connected to the series winding S101 of the main motor. Load current of main motor of the main motor-generator set forms a voltage drop across S101 which is used as the source of electric energy for driving the current follower motor M101.

Figure 4:
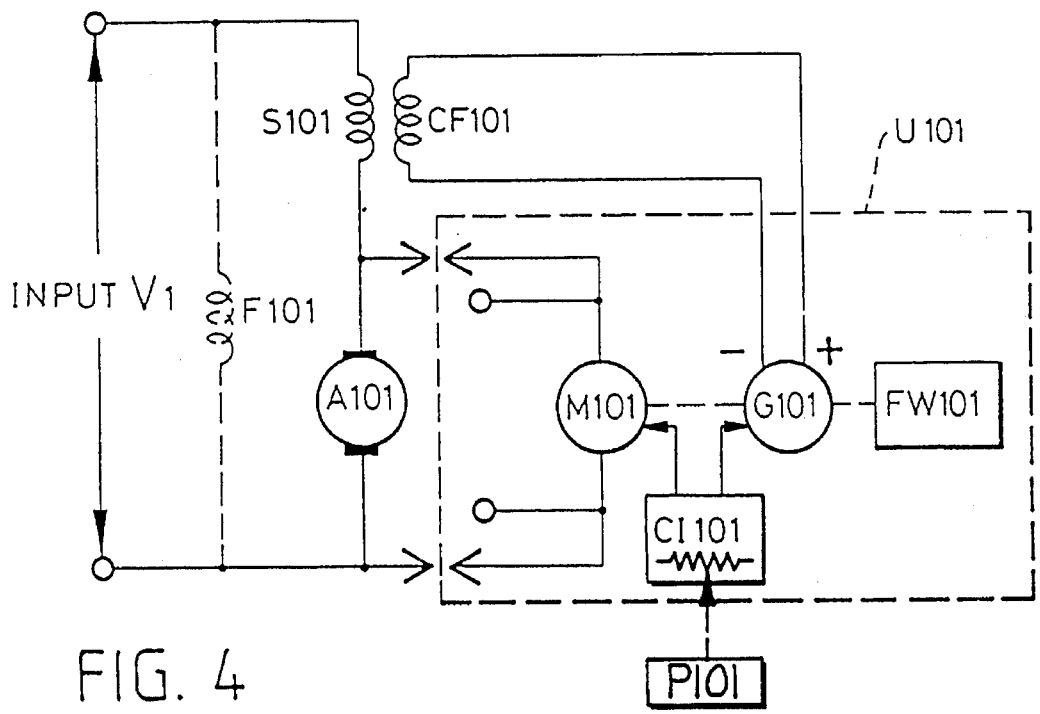
FIG. 4 is a diagram showing an embodiment of the invention in which current follower motor is parallel connected in parrallel with the armature of main motor-generator set.

FIG. 4 is a diagram showing an embodiment of the present invention in which the current follower motor M101 of control circuit U101 is parallel connected to the armature A101 of the main motor-generator set.

The main motor-generator set is a series motor including series field winding S101 and armature A101, or a compound motor further including shunt field winding F101, in addition to having auxiliary field winding CF101 for accepting control circuit U101 control.

Figure 5:
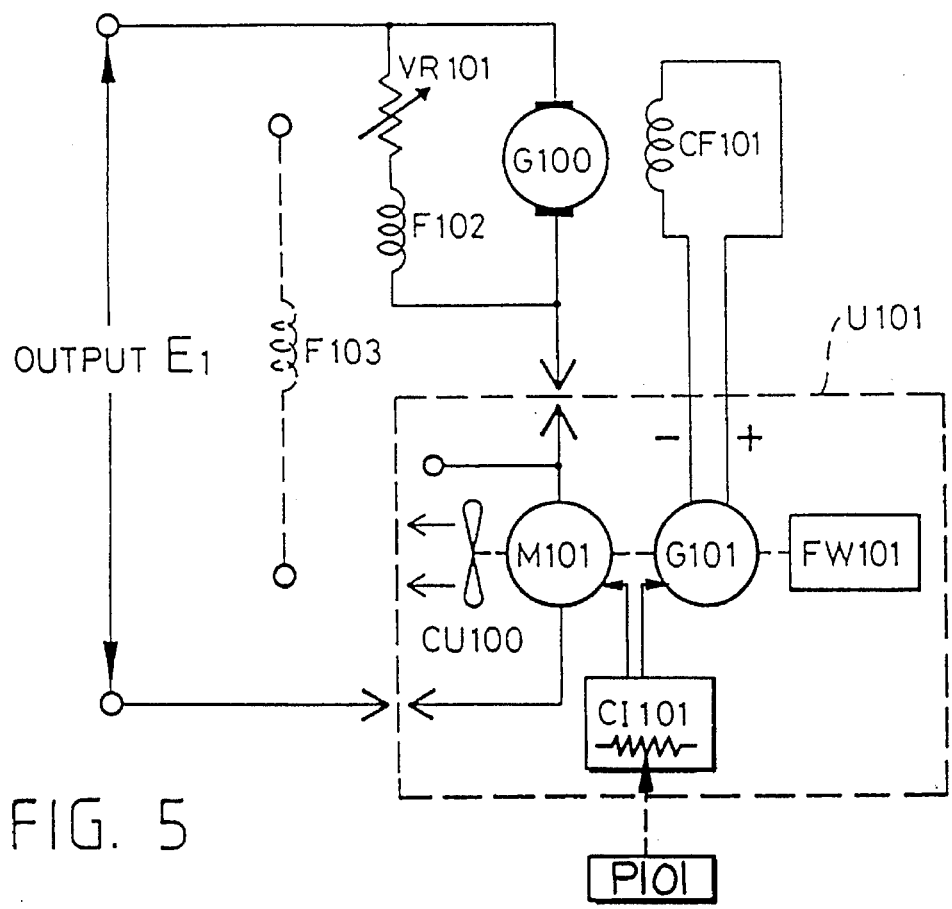
FIG. 5 is a diagram showing an embodiment of the invention in which the current follower motor is connected in series with armature of the generator of the main motor-generator set.

FIG. 5 is a diagram showing an embodiment of the present invention in which the current follower motor M101 of control circuit U101 is connected in series with the generator of the main motor-generator set.

The main motor-generator set generator includes self-excited field winding F103 and generator armature G100, and further includes auxiliary field winding CF101 for accepting feedback unit U101 control. If excessive current occurs on the armature G100, the current follower motor M101 can be parallel connected to the shunt winding F103. In practice, a mechanical flywheel FW101 may be added to the auxiliary generator unit or a capacitor may be parallel connected to the output end of the auxiliary generator G101 for regulating a response relation between the auxiliary field winding CF101 and the main motor-generator set. In the embodiments shown in FIGS. 2, 3 and 5, electric energy of the current follower motor M101 increases in accordance with the armature A101 current of the main motor-generator set. The current follower motor M101 may be used for driving the cool air pump CU100 of the main motor-generator set.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A DC motor-generator control circuit for an electrical machine, said electrical machine having an auxiliary field winding for accepting feedback control, said control circuit comprising:

a current follower motor arranged to receive and be driven by electrical energy from said electrical machine;

an auxiliary generator electrically coupled to said auxiliary field winding of said electrical machine and mechanically driven by said current follower motor; and a control interface for controlling the amount and polarity of the output of said auxiliary generator for feedback to said auxiliary field winding, wherein said electrical machine includes a main motor-generator set comprising a main motor, said main motor of said main motor-generator set further having an armature and a series field winding.

2. The control circuit as claimed in claim 1, wherein said current follower motor is connected in series with said armature of said main motor.

3. The control circuit as claimed in claim 1, wherein said current follower motor is connected in parallel with said series field winding of said main motor.

4. The control circuit as claimed in claim 1, wherein said current follower motor is connected in parallel with said armature of said main motor.

5. The control circuit as claimed in claim 1, wherein said electrical machine further includes a generator of the main motor-generator set, said generator of said main motor-generator set producing an output, and wherein said current follower motor is connected in series with said generator of said main motor-generator set.

6. A DC control circuit for controlling an electrical machine comprising a generator and having an auxiliary field winding, the DC control circuit comprising:

a current follower motor driven by electrical energy from said electrical machine;

an auxiliary generator driven by said current follower motor and producing an output, a control interface for controlling the output of said auxiliary generator, wherein the output of the auxiliary generator is electrically coupled to said auxiliary field winding of the electrical machine, thereby providing a feedback to the auxiliary field winding, and thereby controlling the generator of the electrical machine.

7. The DC control circuit of claim 6, wherein the generator of the electrical machine includes an armature, and wherein the current follower motor is connected in series with the armature of the generator.

8. The DC control circuit of claim 6, wherein the electrical machine further includes a main motor connected to the generator.

* * * * *